US010929238B2

(12) United States Patent
Horowitz et al.

(10) Patent No.: US 10,929,238 B2
(45) Date of Patent: Feb. 23, 2021

(54) MANAGEMENT OF CHANGED-BLOCK BITMAPS

(71) Applicant: Strato Scale Ltd., Herzliya (IL)

(72) Inventors: Alon Horowitz, Tel-Aviv (IL); Roman Speigelman, Yokneam Illit (IL); Ronnie Lazar, Kiryat Ono (IL); Avishay Traeger, Modiin (IL); Rafael Buchbinder, Kiryat Ono (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 475 days.

(21) Appl. No.: 15/884,418

(22) Filed: Jan. 31, 2018

(65) Prior Publication Data

US 2019/0235962 A1 Aug. 1, 2019

(51) Int. Cl.
*G06F 16/00* (2019.01)
*G06F 11/14* (2006.01)
*G06F 3/06* (2006.01)
*G06F 9/455* (2018.01)

(52) U.S. Cl.
CPC .......... *G06F 11/1448* (2013.01); *G06F 3/065* (2013.01); *G06F 9/45558* (2013.01); *G06F 11/1458* (2013.01); *G06F 2009/45579* (2013.01); *G06F 2201/84* (2013.01)

(58) Field of Classification Search
CPC ............... G06F 11/1458; G06F 3/0619; G06F 11/1451; G06F 3/065; G06F 3/0683; G06F 9/45558
See application file for complete search history.

(56) References Cited

U.S. PATENT DOCUMENTS

| 8,443,166 | B2 | 5/2013 | Czezatke et al. |
| 9,268,647 | B1 | 2/2016 | Mam et al. |
| 2009/0327626 | A1* | 12/2009 | Kaushik ............... G06F 11/1466 711/162 |
| 2017/0091046 | A1* | 3/2017 | Bangalore ............. G06F 16/156 |
| 2017/0139787 | A1* | 5/2017 | Singh .................. G06F 11/1464 |

* cited by examiner

*Primary Examiner* — Cheryl Lewis
(74) *Attorney, Agent, or Firm* — Kligler & Associates Patent Attorneys Ltd

(57) ABSTRACT

An apparatus includes an interface and a processor. The interface is configured to communicate with a computing system in which one or more workloads issue storage commands for execution in a storage volume comprising multiple storage blocks. The computing system continually updates a data structure that tracks which of the storage blocks of the storage volume have changed due to the storage commands. The processor is configured, in response to a request to create a copy of the storage volume, to instruct the computing system to (i) create a copy of the data structure and reset the data structure, (ii) create the copy of the storage volume, while continuing to execute the storage commands and update the data structure, and (iii) after the copy of the storage volume is completed, merge the data structure into the copy of the data structure.

16 Claims, 3 Drawing Sheets

MANAGEMENT OF CHANGED-BLOCK BITMAPS

FIELD OF THE INVENTION

The present invention relates generally to data storage, and particularly to methods and systems for management of changed-block bitmaps.

BACKGROUND OF THE INVENTION

Various computing and storage systems store data in logical volumes in units of data blocks. Some storage schemes maintain data structures that track which data blocks have changed, e.g., for efficient backup or replication of logical volumes. Such techniques are sometimes referred to as Changed-Block Tracking (CBT).

SUMMARY OF THE INVENTION

An embodiment of the present invention that is described herein provides an apparatus includes an interface and a processor. The interface is configured to communicate with a computing system in which one or more workloads issue storage commands for execution in a storage volume including multiple storage blocks. The computing system continually updates a data structure that tracks which of the storage blocks of the storage volume have changed due to the storage commands. The processor is configured, in response to a request to create a copy of the storage volume, to instruct the computing system to (i) create a copy of the data structure and reset the data structure, (ii) create the copy of the storage volume, while continuing to execute the storage commands and update the data structure, and (iii) after the copy of the storage volume is completed, merge the data structure into the copy of the data structure.

Typically, the computing system is configured to create the copy of the data structure and reset the data structure atomically, without processing any intervening storage commands. In some embodiments, the data structure and the copy of the data structure include respective bitmaps, and the computing system is configured to merge the data structure into the copy of the data structure by performing a bit-wise OR operation between the bitmaps. In an embodiment, creation of the copy of the data structure and creation of the copy of the storage volume are unsynchronized with one another in the computing system.

In a disclosed embodiment, after merging the data structure into the copy of the data structure, the copy of the data structure indicates that a given storage block has changed, even though the given block has not actually changed. In an example embodiment, after merging the data structure into the copy of the data structure, the copy of the data structure indicates a change in a given storage block, which is reflected in the copy of the storage volume and which was executed in the storage volume after the copy of the data structure was created.

There is additionally provided, in accordance with an embodiment of the present invention, an apparatus including a computing system and a processor. The computing system is configured to run one or more workloads that issue storage commands for execution in a storage volume including multiple storage blocks, and to continually update a data structure that tracks which of the storage blocks of the storage volume have changed due to the storage commands. The processor is configured, in response to a request to create a copy of the storage volume, to instruct the computing system to (i) create a copy of the data structure and reset the data structure, (ii) create the copy of the storage volume, while continuing to execute the storage commands and update the data structure, and (iii) after the copy of the storage volume is completed, merge the data structure into the copy of the data structure.

There is also provided, in accordance with an embodiment of the present invention, a method including communicating with a computing system in which one or more workloads issue storage commands for execution in a storage volume including multiple storage blocks. The computing system continually updates a data structure that tracks which of the storage blocks of the storage volume have changed due to the storage commands. In response to a request to create a copy of the storage volume, the computing system is instructed to (i) create a copy of the data structure and reset the data structure, (ii) create the copy of the storage volume, while continuing to execute the storage commands and update the data structure, and (iii) after the copy of the storage volume is completed, merge the data structure into the copy of the data structure.

There is further provided, in accordance with an embodiment of the present invention, a computer software product, the product including a tangible non-transitory computer-readable medium in which program instructions are stored, which instructions, when read by a processor, cause the processor to communicate with a computing system in which one or more workloads issue storage commands for execution in a storage volume including multiple storage blocks, wherein the computing system continually updates a data structure that tracks which of the storage blocks of the storage volume have changed due to the storage commands, and, in response to a request to create a copy of the storage volume, instruct the computing system to (i) create a copy of the data structure and reset the data structure, (ii) create the copy of the storage volume, while continuing to execute the storage commands and update the data structure, and (iii) after the copy of the storage volume is completed, merge the data structure into the copy of the data structure.

The present invention will be more fully understood from the following detailed description of the embodiments thereof, taken together with the drawings in which:

DETAILED DESCRIPTION OF EMBODIMENTS

Overview

Figure 1:
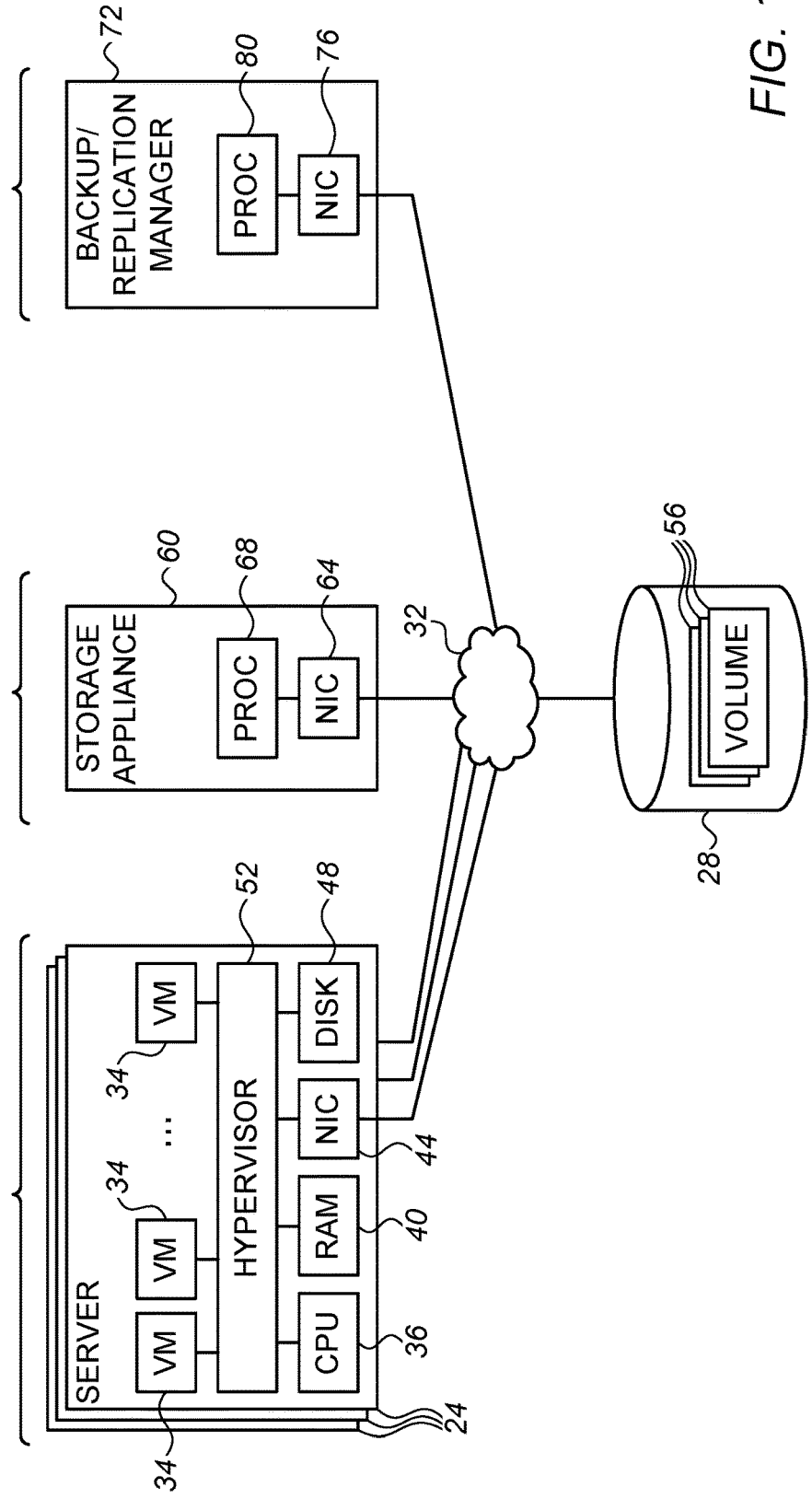
FIG. 1 is a block diagram that schematically illustrates a computing system, in accordance with an embodiment of the present invention.

Embodiments of the present invention that are described herein provide improved methods and apparatus for managing changed-block bitmaps and similar data structures in computing systems.

In some embodiments, a computing system runs workloads, e.g., Virtual Machines (VMs), which issue storage commands for execution in one or more storage volumes. Each storage volume comprises multiple storage blocks. For each storage volume, the computing system continually maintains a data structure that tracks which of the storage blocks of the storage volume have changed due to the storage commands. The data structures enable the computing system to backup and/or replicate volumes efficiently, for example.

A challenge encountered when implementing the above scheme is maintaining consistency between a copy of a storage volume and a copy of the corresponding data structure, given the fact the workloads continue to issue storage commands to the storage volume during creation of the copy.

One way of ensuring consistency is to stall all storage commands to the storage volume during creation of the copies. This solution, however, degrades storage throughput and latency. Another possibility is to create the copy of the storage volume and the copy of the data structure atomically. This atomicity requirement, however, is not feasible in some system configurations.

Embodiments of the present invention overcome the above challenge without requiring atomicity between the storage volume and the data structure, and without having to stall storage commands. The example embodiments described herein refer mainly to a backup/replication manager that carries out the disclosed techniques by communication with the computing system. Generally, however, the disclosed techniques can be carried out by any other suitable system element for any other suitable purpose.

In some embodiments, in response to a request to create a copy of a certain storage volume, the backup/replication manager instructs the computing system to perform the following actions:

Create a copy of the data structure and then reset the data structure. (In one embodiment, the data structure comprises a bitmap, and resetting the bitmap comprises initializing the bitmap to all-zeros.) Equivalently, the operation of copying and then resetting the data structure can also be implemented by swapping the current data structure with a new, reset data structure. In the present context, any such equivalent operation is also regarded as copying and resetting the data structure.

Once the data structure has been reset, create the requested copy of the storage volume, while continuing execution of storage commands and updating of the data structure.

After the copy of the storage volume is completed, update the copy of the data structure by merging the data structure into the copy of the data structure. (When the data structure and its copy comprise bitmaps, the merging operation comprises performing a bit-wise OR operation between the bitmaps, and storing the result as the copy of the bitmap.)

Following the above sequence of operations, the copy of the storage volume and the copy of the data structure are consistent with one another. In this context, the term "consistent" means that the copy of the data structure reflects at least all the write commands that are included in the copy of the volume. It is possible that the copy of the data structure reflects one or more write commands that are not yet included in the copy of the volume. This discrepancy may add a small amount of overhead, e.g., copying of a block that has not actually changed. The important result, however, is that all the changed blocks in the copy of the volume will be reflected in the copy of the bitmap, i.e., no changed block will be missed.

The consistency between the copy of the volume and the copy of the data structure is achieved even though storage commands continue to arrive at the storage volume without interruption. The disclosed techniques therefore do not cause performance degradation. Moreover, the disclosed techniques achieve consistency without requiring atomicity between the copy of the storage volume and the data structure, and are therefore applicable in a wide variety of system configurations.

System Description

FIG. 1 is a block diagram that schematically illustrates a computing system 20, in accordance with an embodiment of the present invention. System 20 comprises one or more servers 24 and a storage subsystem 28, which communicate with one another over a communication network 32.

Servers 24 runs Virtual Machines (VMs) 34. Each server 24 typically comprises a Central Processing Unit (CPU) 36, a memory such as a Random Access Memory (RAM) 40, a Network Interface Controller (NIC) 44 and a disk 48. CPU 36 runs a software module referred to as a hypervisor (HV) 52, HV 52 serves as a virtualization layer that allocates the physical resources of the server, e.g., the resources of CPU 36, RAM 40, NIC 44 and disk 48, to VMs 34 running on the server.

Among other tasks, VMs 34 store data in one or more logical volumes 56 residing on storage subsystem 28. Logical volumes 56 are also referred to herein as "storage volumes" or simply as "volumes" for brevity. The storage commands, e.g., read and write commands, issued from VMs 34 to volumes 56 are also referred to herein as "I/Os".

Computing system 20 further comprises a storage appliance 60, which manages the storage of data in storage subsystem 28. Among other tasks, storage appliance 60 creates copies of selected storage volumes 56. A copy of a storage volume is also referred to as a snapshot or a clone. The description that follows uses mainly the term "volume snapshot." Storage appliance 60 comprises a NIC 64 for communicating over network 32, and a processor 68 that is configured to carry out the various tasks of the storage appliance.

In some embodiments, each logical volume 56 comprises multiple storage blocks (also referred to herein as "data blocks" or simply "blocks"). For each volume 56, system 20 continually maintains a respective data structure that tracks which of the blocks of the volume have changed due to the storage commands since the data structure was last reset (initialized).

In the present example, the data structure of each volume comprises a bitmap, also referred to herein as a "changed-block bitmap" or "CBT bitmap." The bitmap of a volume comprises a respective bit for each block of the volume. The bitmap is initially reset to all "0" s. A bit set to "0" indicates that the corresponding block has not changed since the bitmap was reset. A bit set to "1" indicates that the corresponding block has changed since the bitmap was reset.

System 20 may use the bitmaps for various purposes, e.g., as part of a backup process that backs-up certain volumes, or as part of a replication process that replicates certain volumes 56 to remote storage. The bitmaps enables such processes, for example, to refrain from copying blocks that have not changed.

In the example configuration of FIG. 1, each HV 52 is responsible for continually maintaining the changed-block bitmaps of the volumes 56 used by the VMs hosted by the HV. Typically, each HV 52 tracks the storage commands (I/Os) that VMs 34 of that server issue, as the storage commands traverse the HV en-route to storage subsystem 28. By tracking the storage commands, the HV is able to update the various bitmaps. In an example embodiment, in response to each write command passing through the HV, the HV sets the bit of the corresponding storage block (the block to which the write command is addressed) to "1". Each HV is also configured to create copies of bitmaps (referred to herein as "bitmap snapshots"), and to reset bitmaps to all "0" s.

In some embodiments, a backup/replication manager 72 carries out backup and/or replication of volumes for computing system 20. As will be explained in detail below, backup/replication manager 72 synchronizes the creation of volume snapshots and bitmap snapshots, so as to provide consistency without having to stall storage commands. Backup/replication manager 72 comprises a NIC 76 for communicating over network 32, and a processor 80 that is configured to carry out the various tasks of the storage appliance.

The configurations of computing system 20, including servers 24 and storage appliance 60, and the configuration of backup/replication manager 72, shown in FIG. 1, are example configurations that are chosen purely for the sake of conceptual clarity. In alternative embodiments, any other suitable configurations can be used.

For example, the workloads that issue storage commands are not limited to VMs, and may comprise processes, containers or any other suitable type or workloads. The workloads may run on any suitable computers, not necessarily on servers, or even on a single computer. Storage subsystem 28 may comprise, for example, a single storage device, e.g., disk, an array of storage devices managed by some storage controller, or any other suitable storage subsystem.

Network 32 may comprise any suitable type of network, e.g., a Local Area Network (LAN) or a Wide Area Network (WAN) such as the Internet. Alternatively, the disclosed techniques can also be used within a particular computer rather than over a network, e.g., when storing logical volumes locally on disk 48.

As yet another example, storage appliance 60 need not necessarily be a standalone computer as in FIG. 1. In alternative embodiments, storage appliance 60 may be implemented on any suitable computer, e.g., on one of servers 24. Similarly, backup/replication manager 72 need not necessarily be a standalone computer as in FIG. 1, and may alternatively be implemented on any suitable computer, e.g., on one of servers 24. In the latter embodiment, NIC 44 of that server serves as the interface that connects the backup/replication manager to the network, and CPU 36 of that server serves as the processor that carries out the disclosed tasks of the backup/replication manager.

The various elements of computing system 20, including servers 24 and their components and storage appliance 60 and its components, and the configuration of backup/replication manager 72 and its components, may be implemented using hardware/firmware, such as in one or more Application-Specific Integrated Circuit (ASICs) or Field-Programmable Gate Array (FPGAs). Alternatively, some elements may be implemented in software or using a combination of hardware/firmware and software elements.

In some embodiments, CPUs 36, processor 68 and processor 80 may comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Efficient and Decoupled Management of Changed-Block Bitmaps

In the example configuration of system 20 shown in FIG. 1, volume snapshots are created by one system element (storage appliance 60), whereas changed-block bitmaps are managed by another system element (hypervisors 52). In such a configuration, creation of a volume snapshot is unsynchronized with creation of the corresponding bitmap snapshot. As such, there is no guaranteed atomicity between operations relating to volume snapshots and operations relating to bitmaps. Nevertheless, processor 80 of backup/replication manager 72 manages the creation of volume snapshots and bitmaps in a manner that (i) guarantees consistency between the volume snapshots and bitmaps, and (ii) does not require stalling storage commands.

FIG. 1 depicts just one example of a system configuration characterized by lack of atomicity between operations relating to volume snapshots and operations relating to bitmaps. A similar problem may be encountered in various other system configurations. The disclosed techniques are applicable in any such system configuration, as well as in configurations that do not suffer from atomicity problems.

Figure 2:
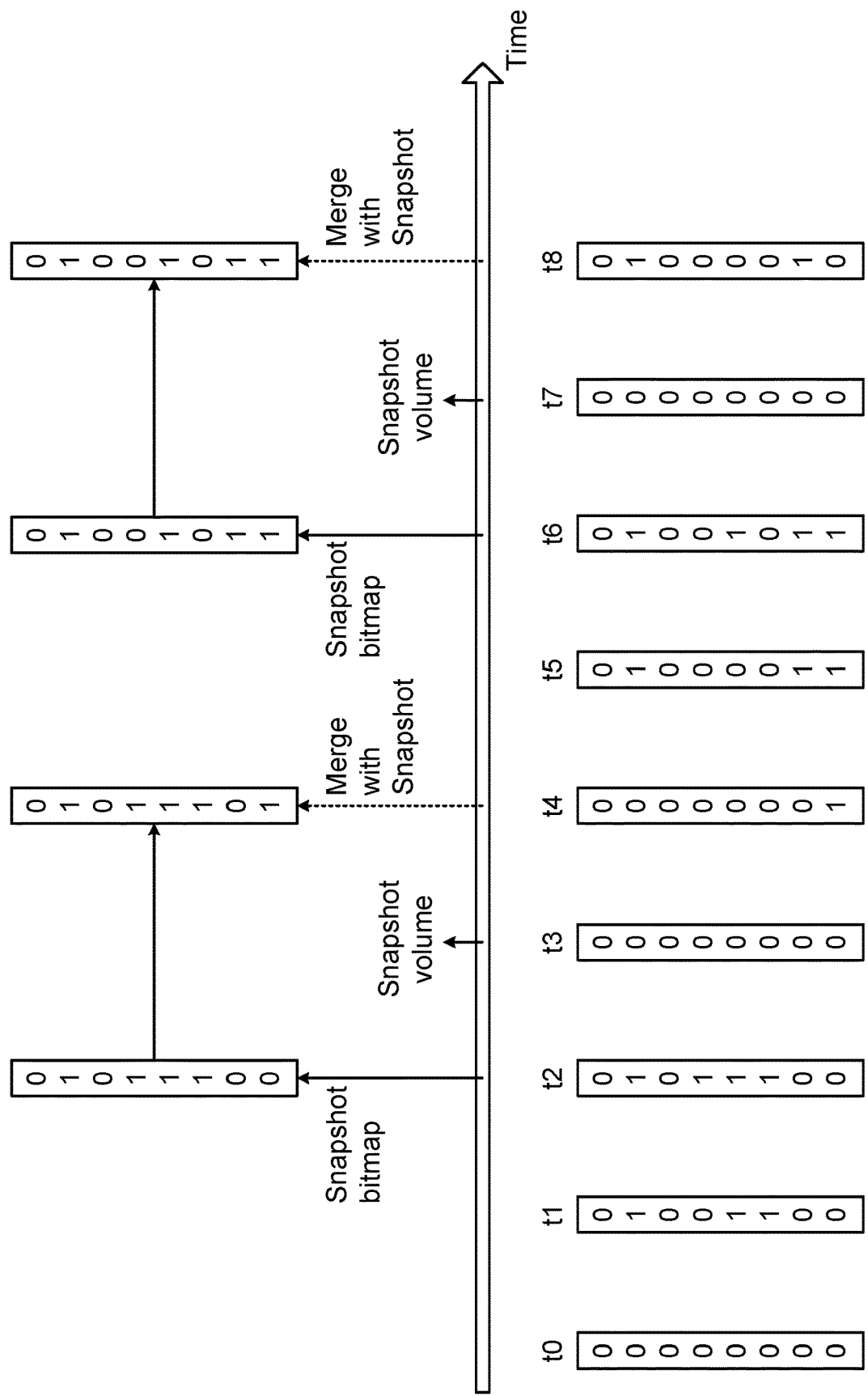
FIG. 2 is a diagram that schematically illustrates a process of creating snapshots of a storage volume and of a corresponding changed-block bitmap, in accordance with an embodiment of the present invention.

FIG. 2 is a diagram that schematically illustrates a process of creating snapshots of a volume and of a corresponding changed-block bitmap, in accordance with an embodiment of the present invention. The figure refers to an example volume having eight blocks. The changed-block bitmap of this volume, and snapshots thereof, are shown at nine points in time denoted t0, t1, . . . , t8.

Initially, at t0, the bitmap is initialized to all-zeros. During the interval between t0 and t1, three of the block of the volume change due to write commands from VMs 34. In response, HV 52 sets the three corresponding bits in the bitmap to "1"—As seen in the bitmap at t1. Between t1 and t2, another block changes, and therefore the bitmap at t2 has the bit of that block also set to "1".

Shortly before time t2, a request to create a snapshot of the volume is triggered, for any reason. In response to the request, processor 80 sends an instruction to HV 52 to create a snapshot of the bitmap and to reset the bitmap to all-"0"s. HV 52 performs these two operations atomically, and acknowledges completion to processor 80. Once the bitmap has been reset, processor 80 sends an instruction to storage appliance 60 to create a snapshot of the volume. The storage appliance creates the requested snapshot, and acknowledges completion.

In practice, as explained above, one or more write commands may be performed on the volume between the time the bitmap snapshot is created and the time the volume snapshot is created. Thus, in some cases one or more write commands may be reflected in the volume snapshot but not in the bitmap snapshot.

During the interval between t3 and t4, an additional block changes and its bit in the bitmap is set to "1". At time t4, after the volume snapshot is ready, processor 80 instructs HV 52 to merge the bitmap into the bitmap snapshot. The HV performs this merge, e.g., performs a bit-wise OR between the bitmap and the bitmap snapshot. The result is used to update the bitmap snapshot.

The merge operation updates the bitmap snapshot to also include any changed blocks whose changes are included in the volume snapshot, and which changed after the bitmap snapshot was created. At this stage, the bitmap snapshot and the volume snapshot are fully consistent with one another, in spite of the lack of atomicity and the intervening write commands. As explained above, the term "consistent" means that the bitmap snapshot reflects at least all the write commands that are included in the volume snapshot, and possibly more.

A similar process is performed again between times t6 and t8. The request to create the volume snapshot is triggered shortly before time t6. The bitmap snapshot is created at time t6, atomically with resetting of the bitmap. The volume snapshot is created later, at time t7. At time t8 the volume snapshot is complete, and the bitmap is merged into the bitmap snapshot. The bitmap snapshot and the volume snapshot are now fully consistent with one another.

Figure 3:
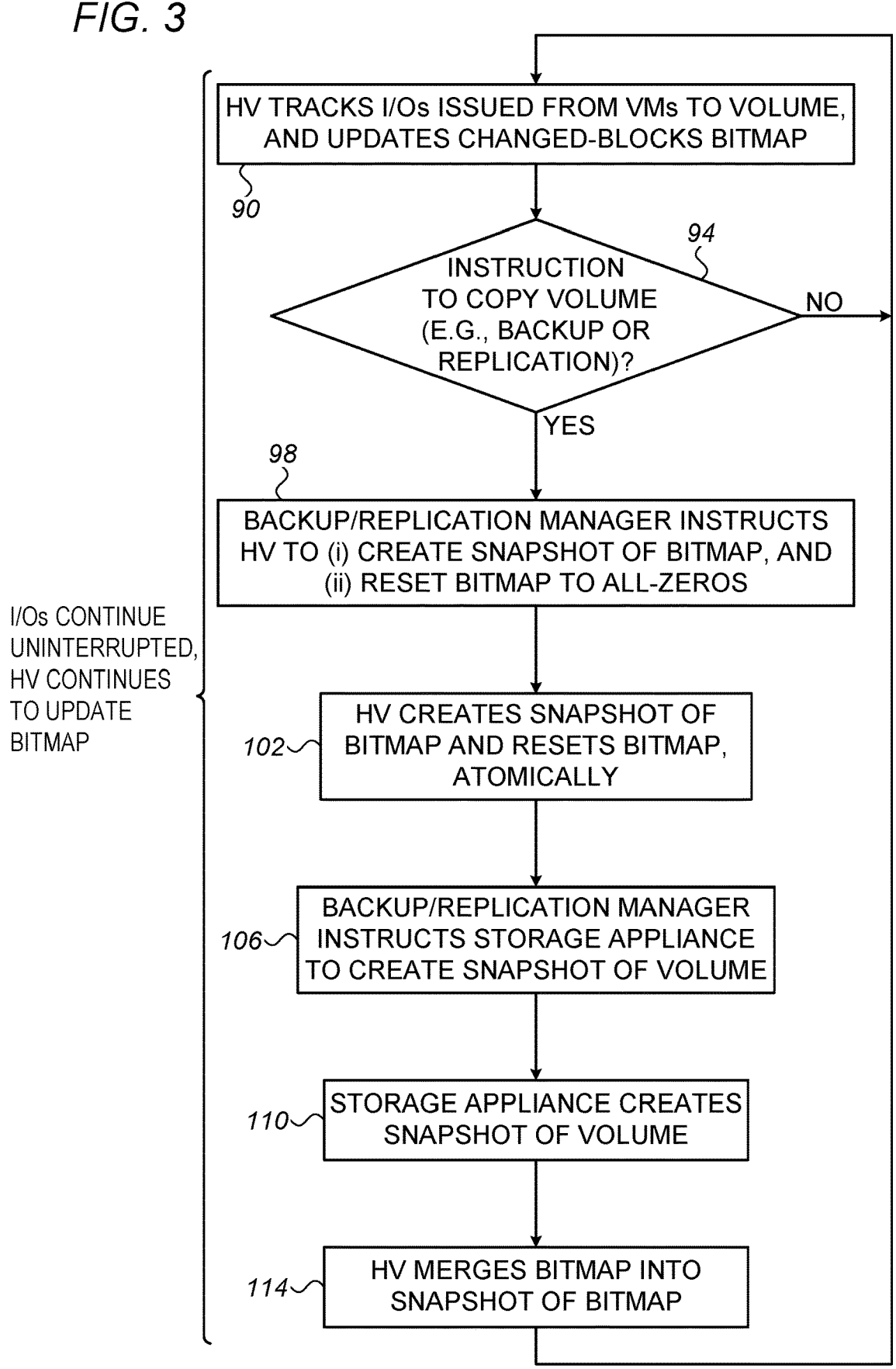
FIG. 3 is a flow chart that schematically illustrates a method for creating snapshots of a storage volume and of a corresponding changed-block bitmap, in accordance with an embodiment of the present invention.

FIG. 3 is a flow chart that schematically illustrates a method for creating snapshots of a volume and of a corresponding changed-block bitmap, in accordance with an embodiment of the present invention. As explained above, storage commands may continue to be executed in the volume without interruption during the entire process.

The method begins with hypervisor 52 in server 24 tracking storage commands (I/Os) issued by VMs 34 to the storage volume, and updating the changed-block bitmap of the volume to reflect the storage commands, at a normal operation step 90. At a checking step 94, a check is made as to whether a request is triggered to create a copy of the volume. If not, the method loops back to normal operation step 90.

When a request to create a copy of the volume is triggered, processor 80 of backup/replication manager 72 instructs HV 52 to create a snapshot of the bitmap and to reset the bitmap itself to all-"0"s, at a bitmap snapshot instruction step 98. The HV performs the requested actions, atomically, at a bitmap snapshot creation step 102. The HV sends processor 80 an acknowledgement, confirming that the bitmap snapshot has been created and that the bitmap has been reset. As noted above, the HV may equivalently perform the operations of (i) creating a bitmap snapshot and (ii) resetting the bitmap, by swapping the existing bitmap with a new, reset (all-"0"s) bitmap.

In response to the acknowledgement, processor 80 instructs storage appliance 60 to create a snapshot of the volume, at a volume snapshot instruction step 106. The storage appliance performs the requested action, at a volume snapshot creation step 110, and acknowledges completion.

Once the volume snapshot is ready, processor 80 instructs HV 52 to merge the current snapshot (which also reflects all intervening write commands that have arrived since the bitmap snapshot was taken) into the bitmap snapshot, at a merging instruction step 114. The HV performs the merging operation, and again acknowledges complation. At this stage, the volume snapshot and the bitmap snapshot are consistent (per the above definition of consistency, meaning that the "1" bits in the bitmap snapshot represent at least all the changed blocks in the volume, and possibly more).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
an interface, configured to communicate with a computing system in which one or more workloads issue storage commands for execution in a storage volume comprising multiple storage blocks, wherein the computing system updates a changed-block data structure that tracks which of the storage blocks of the storage volume have changed due to the storage commands, since a previous reset of the changed-block data structure, for use by a backup process or a replication process; and
a processor, which is configured, in response to a request to create a copy of the storage volume, to instruct the computing system to:
(i) create a copy of the changed-block data structure and reset the changed-block data structure, to indicate that none of the blocks have changed;
(ii) create the copy of the storage volume, while continuing to execute the storage commands and update the changed-block data structure; and
(iii) after the copy of the storage volume is completed, merge the changed-block data structure into the copy of the changed-block data structure.

2. The apparatus according to claim 1, wherein the computing system is configured to create the copy of the changed-block data structure and reset the changed-block data structure atomically, without processing any intervening storage commands.

3. The apparatus according to claim 1, wherein the changed-block data structure and the copy of the changed-block data structure comprise respective bitmaps, and wherein the computing system is configured to merge the changed-block data structure into the copy of the changed-block data structure by performing a bit-wise OR operation between the bitmaps.

4. The apparatus according to claim 1, wherein creation of the copy of the changed-block data structure and creation of the copy of the storage volume are unsynchronized with one another in the computing system.

5. The apparatus according to claim 1, wherein, after merging the changed-block data structure into the copy of the changed-block data structure, the copy of the changed-block data structure indicates that a given storage block has changed, even though the given block has not actually changed.

6. The apparatus according to claim 1, wherein, after merging the changed-block data structure into the copy of the changed-block data structure, the copy of the changed-block data structure indicates a change in a given storage block, which is reflected in the copy of the storage volume and which was executed in the storage volume after the copy of the changed-block data structure was created.

7. The apparatus according to claim 1, wherein the processor is configured to copy and reset the changed-block data structure by swapping the existing changed-block data structure with a new, reset changed-block data structure.

8. An apparatus, comprising:
a computing system, which is configured to:
run one or more workloads that issue storage commands for execution in a storage volume comprising multiple storage blocks; and repeatedly update a changed-block data structure that tracks which of the storage blocks of the storage volume have changed due to the storage commands since a previous reset of the changed-block data structure, for use by a backup process or a replication process; and a processor, which is configured, in response to a request to create a copy of the storage volume, to instruct the computing system to:
  (i) create a copy of the changed-block data structure and reset the changed-block data structure, to indicate that none of the blocks have changed;
  (ii) create the copy of the storage volume, while continuing to execute the storage commands and update the changed-block data structure; and
  (iii) after the copy of the storage volume is completed, merge the changed-block data structure into the copy of the changed-block data structure.

9. A method, comprising:

communicating with a computing system in which one or more workloads issue storage commands for execution in a storage volume comprising multiple storage blocks, wherein the computing system updates a changed-block data structure that tracks which of the storage blocks of the storage volume have changed due to the storage commands, since a previous reset of the changed-block data structure, for use by a backup process or a replication process; and in response to a request to create a copy of the storage volume, instructing the computing system to:
  (i) create a copy of the changed-block data structure and reset the changed-block data structure, to indicate that none of the blocks have changed;
  (ii) create the copy of the storage volume, while continuing to execute the storage commands and update the changed-block data structure; and
  (iii) after the copy of the storage volume is completed, merge the changed-block data structure into the copy of the changed-block data structure.

10. The method according to claim 9, wherein creating the copy of the changed-block data structure and resetting the changed-block data structure are performed atomically, without processing any intervening storage commands.

11. The method according to claim 9, wherein the changed-block data structure and the copy of the changed-block data structure comprise respective bitmaps, and wherein the computing system merges the changed-block data structure into the copy of the changed-block data structure by performing a bit-wise OR operation between the bitmaps.

12. The method according to claim 9, wherein creation of the copy of the changed-block data structure and creation of the copy of the storage volume are unsynchronized with one another in the computing system.

13. The method according to claim 9, wherein, after merging the changed-block data structure into the copy of the changed-block data structure, the copy of the changed-block data structure indicates that a given storage block has changed, even though the given block has not actually changed.

14. The method according to claim 9, wherein, after merging the changed-block data structure into the copy of the changed-block data structure, the copy of the changed-block data structure indicates a change in a given storage block, which is reflected in the copy of the storage volume and which was executed in the storage volume after the copy of the changed-block data structure was created.

15. The method according to claim 9, wherein creating the copy and resetting the changed-block data structure comprise swapping the existing changed-block data structure with a new, reset changed-block data structure.

16. A computer software product, the product comprising a tangible non-transitory computer-readable medium in which program instructions are stored, which instructions, when read by a processor, cause the processor to:

communicate with a computing system in which one or more workloads issue storage commands for execution in a storage volume comprising multiple storage blocks, wherein the computing system updates a changed-block data structure that tracks which of the storage blocks of the storage volume have changed due to the storage commands, since a previous reset of the changed-block data structure, for use by a backup process or a replication process; and in response to a request to create a copy of the storage volume, instruct the computing system to:
  (i) create a copy of the changed-block data structure and reset the changed-block data structure, to indicate that none of the blocks have changed;
  (ii) create the copy of the storage volume, while continuing to execute the storage commands and update the changed-block data structure; and
  (iii) after the copy of the storage volume is completed, merge the changed-block data structure into the copy of the changed-block data structure.

* * * * *